United States Patent
Nagabhushanrao et al.

(10) Patent No.: US 11,283,288 B2
(45) Date of Patent: Mar. 22, 2022

(54) INTEGRATED DC TO DC CONVERTER UPS TOPOLOGY

(71) Applicant: SCHNEIDER ELECTRIC IT CORPORATION, Foxboro, MA (US)

(72) Inventors: Pradeep Tolakanahalli Nagabhushanrao, Bangalore (IN); Chandrasekaran Jayaraman, Bangalore (IN); Hariom Agrawal, Bengaluru (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/440,144

(22) Filed: Jun. 13, 2019

(65) Prior Publication Data

US 2020/0006980 A1 Jan. 2, 2020

(30) Foreign Application Priority Data

Jun. 27, 2018 (IN) .............................. 201811023980

(51) Int. Cl.
*H02J 9/06* (2006.01)
*H02M 1/42* (2007.01)
*H02M 3/335* (2006.01)

(52) U.S. Cl.
CPC ........... *H02J 9/062* (2013.01); *H02M 1/4208* (2013.01); *H02M 3/33507* (2013.01)

(58) Field of Classification Search
CPC ... H02J 9/062; H02M 1/4208; H02M 3/33507
See application file for complete search history.

(56) References Cited

U.S. PATENT DOCUMENTS

| 5,737,204 A | 4/1998 | Brown |
| 6,483,730 B2 | 11/2002 | Johnson, Jr. |
| 6,661,678 B2 | 12/2003 | Raddi et al. |
| 6,944,035 B2 | 9/2005 | Raddi et al. |

(Continued)

FOREIGN PATENT DOCUMENTS

| CN | 101685975 B | 2/2013 |
| JP | 2013251963 A | 12/2013 |

OTHER PUBLICATIONS

Extended European Search Report from corresponding European Application No. 19180451.7 dated Nov. 22, 2019.

*Primary Examiner* — Rafael O De Leon Domenech
(74) *Attorney, Agent, or Firm* — Lando & Anastasi, LLP

(57) ABSTRACT

According to one aspect, embodiments of the invention provide a UPS comprising a line input, an interface configured to be coupled to a DC power source, an output, a PFC converter, a positive DC bus coupled to the PFC converter and configured to provide a positive DC output, a negative DC bus coupled to the PFC converter and configured to provide a negative DC output, a DC-DC converter coupled to the interface, and a controller configured to operate, in an online mode of operation, the PFC converter to provide regulated DC power, derived from input AC power, to the positive DC bus and the negative DC bus, and operate, in a backup mode of operation, the DC-DC converter to convert backup DC power to unregulated power, and the PFC converter to provide regulated DC power, derived from the unregulated power, to the positive DC bus and the negative DC bus.

19 Claims, 8 Drawing Sheets

(56) References Cited

U.S. PATENT DOCUMENTS

| | | | |
|---|---|---|---|
| 7,402,921 B2 | 7/2008 | Ingemi et al. | |
| 2006/0043793 A1* | 3/2006 | Hjort | H02J 9/062 307/1 |
| 2009/0037768 A1* | 2/2009 | Adams | G06F 1/30 714/14 |
| 2011/0305049 A1* | 12/2011 | Raptis | H02J 9/062 363/34 |
| 2012/0112547 A1* | 5/2012 | Ghosh | H02J 9/062 307/66 |
| 2012/0248875 A1* | 10/2012 | Fang | H02M 7/42 307/66 |
| 2013/0026835 A1* | 1/2013 | Ghosh | H02M 1/10 307/66 |
| 2013/0026836 A1* | 1/2013 | Dighrasker | H02J 9/062 307/66 |
| 2013/0049699 A1* | 2/2013 | Jayaraman | H02M 5/458 320/137 |
| 2014/0268890 A1 | 9/2014 | Xie et al. | |
| 2015/0270744 A1 | 9/2015 | Lacarnoy | |
| 2016/0342182 A1* | 11/2016 | Deboy | G06F 1/28 |
| 2017/0294777 A1* | 10/2017 | Teymour Ghasemabadi | H02J 9/062 |

* cited by examiner

INTEGRATED DC TO DC CONVERTER UPS TOPOLOGY

CROSS-REFERENCE TO RELATED APPLICATION

This application claims the benefit under 35 U.S.C. § 119 of Indian Patent Application No. 201811023980 filed on Jun. 27, 2018, which is hereby incorporated herein by reference in its entirety for all purposes.

BACKGROUND

1. Field of Invention

The present invention relates generally to uninterruptible power supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the invention is directed to an Uninterruptible Power Supply (UPS) comprising a line input configured to be coupled to an AC power source and to receive input AC power, an interface configured to be coupled to a DC power source and to receive backup DC power, an output configured to provide output power to a load, a PFC converter, a positive DC bus coupled to the PFC converter and configured to provide a positive DC output, a negative DC bus coupled to the PFC converter and configured to provide a negative DC output, a DC-DC converter coupled to the interface, and a controller configured to operate, in an online mode of operation, the PFC converter to provide regulated DC power, derived from the input AC power, to the positive DC bus and the negative DC bus, and operate, in a backup mode of operation, the DC-DC converter to convert the backup DC power to unregulated power, and the PFC converter to provide regulated DC power, derived from the unregulated power, to the positive DC bus and the negative DC bus.

According to one embodiment, the UPS further comprises a relay configured to selectively couple the PFC converter to one of the line input and the DC-DC converter, wherein, in the online mode of operation, the controller is further configured to operate the relay to couple the PFC converter to the line input, and wherein, in the backup mode of operation, the controller is further configured to operate the relay to couple the PFC converter to the DC-DC converter. In one embodiment, in operating the PFC converter to provide the regulated DC power, derived from the unregu- lated power, to the positive DC bus and the negative DC bus, the controller is further configured to operate the PFC converter to independently provide first regulated DC power having a first voltage level, derived from the unregulated power, to the positive DC bus and second regulated DC power having a second voltage level, derived from the unregulated power, to the negative DC bus.

According to another embodiment, the DC-DC converter comprises a first plurality of switches coupled to the interface, and a transformer coupled to the first plurality of switches. In one embodiment, in operating the DC-DC converter to convert the backup DC power to unregulated power, the controller is further configured to operate the first plurality of switches at a fixed duty cycle in an open loop, in conjunction with the transformer, to generate the unregulated power. In another embodiment, in operating the first plurality of switches, the controller is further configured to operate the first plurality of switches at a 50% duty cycle.

According to one embodiment, the PFC converter comprises a plurality of diodes coupled to the relay, and a second plurality of switches coupled to the plurality of diodes, the positive DC bus, and the negative DC bus. In one embodiment, in operating the PFC converter to provide regulated DC power, derived from the input AC power, to the positive DC bus and the negative DC bus, the controller is further configured to operate the second plurality of switches, in conjunction with the plurality of diodes, to generate the regulated DC power, derived from the input AC power. In another embodiment, in operating the PFC converter to provide regulated DC power, derived from the unregulated power, to the positive DC bus and the negative DC bus, the controller is further configured to operate the second plurality of switches, in conjunction with the plurality of diodes, to generate the regulated DC power, derived from the unregulated power.

According to another embodiment, in operating the DC-DC converter to convert the backup DC power to unregulated power, the controller is further configured to operate the first plurality of switches at the fixed duty cycle in the open loop, in conjunction with the transformer, to generate unregulated AC power, wherein, in the backup mode of operation, the plurality of diodes are configured to convert the unregulated AC power to unregulated DC power, and wherein in operating the PFC converter to provide regulated DC power, derived from the unregulated power, to the positive DC bus and the negative DC bus, the controller is further configured to operate the second plurality of switches to convert the unregulated DC power to the regulated DC power.

According to one embodiment, the UPS further comprises an inverter coupled to the positive DC bus and the negative DC bus, wherein the controller is further configured to operate, in the online mode of operation and the backup mode of operation, the inverter to convert the regulated DC power from the positive DC bus and the negative DC bus into output AC power.

Another aspect of the invention is directed to a method for operating a UPS comprising an input configured to be coupled to an AC power source, an interface configured to be coupled to a DC power source, a converter, a positive DC bus coupled to the converter, a negative DC bus coupled to the converter, and a DC-DC converter coupled to the interface, wherein the method comprises receiving input AC power at the input from the AC power source, receiving backup DC power at the interface from the DC power source, operating the UPS in an online mode of operation in response to a determination that the input AC power is greater than an input power threshold, operating the UPS in a backup mode of operation in response to a determination that the input AC power is less than the input power threshold, converting, with the converter in the online mode of operation, the input AC power to regulated DC power and providing the regulated DC power, derived from the input AC power, to the positive DC bus and the negative DC bus, operating, in the backup mode of operation, the DC-DC converter to convert the backup DC power to unregulated power and providing the unregulated power to the converter, and converting, with the converter in the backup mode of operation, the unregulated power to regulated DC power and providing the regulated DC power, derived from the unregulated power, to the positive DC bus and the negative DC bus.

According to one embodiment, the UPS further comprises a relay configured to selectively couple the converter to one of the input and the DC-DC converter, operating the UPS in the online mode of operation comprises operating the relay to couple the converter to the input, and operating the UPS in the backup mode of operation comprises operating the relay to couple the converter to the DC-DC converter. In one embodiment, providing the regulated DC power, derived from the unregulated power, to the positive DC bus and the negative DC bus comprises independently providing first regulated DC power having a first voltage level, derived from the unregulated power, to the positive DC bus and second regulated DC power having a second voltage level, derived from the unregulated power, to the negative DC bus.

According to another embodiment, operating, in the backup mode of operation, the DC-DC converter to convert the backup DC power to unregulated power comprises operating a first plurality of switches in the DC-DC converter at a fixed duty cycle in an open loop to generate the unregulated power. In one embodiment, operating the first plurality of switches in the DC-DC converter at the fixed duty cycle in the open loop to generate the unregulated power comprises operating the first plurality of switches at a 50% duty cycle. In another embodiment, converting, in the online mode of operation, the input AC power to regulated DC power with the converter comprises operating a second plurality of switches in the converter to generate the regulated DC power, derived from the input AC power.

According to one embodiment, operating the DC-DC converter to convert the backup DC power to unregulated power includes operating the DC-DC converter to convert the backup DC power to unregulated AC power, and converting, in the backup mode of operation, the unregulated power to regulated DC power with the converter comprises converting the unregulated AC power to unregulated DC power, and operating the second plurality of switches in the converter to generate the regulated DC power, derived from the unregulated DC power.

According to another embodiment, the method further comprises converting, with an inverter in the online mode of operation and the backup mode of operation, the regulated power from the positive DC bus and the negative DC bus into output AC power and providing the output AC power to a load coupled to the output.

At least one aspect of the invention is directed to a UPS comprising an input configured to be coupled to an AC power source and to receive input AC power, an interface configured to be coupled to a DC power source and to receive backup DC power, an output configured to provide output power to a load, a converter, a positive DC bus coupled to the converter, a negative DC bus coupled to the converter, an inverter coupled to the positive DC bus and the negative DC bus, a DC-DC converter coupled to the interface, and means for providing isolation between the interface and the converter, for generating the output power derived from at least one of the input AC power and the backup DC power, for independently regulating a voltage level of the positive DC bus and a voltage level of the negative DC bus when the output AC power is derived from the backup DC power, and for utilizing components of the converter as part of the DC-DC converter when the output AC power is derived from the backup DC power.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
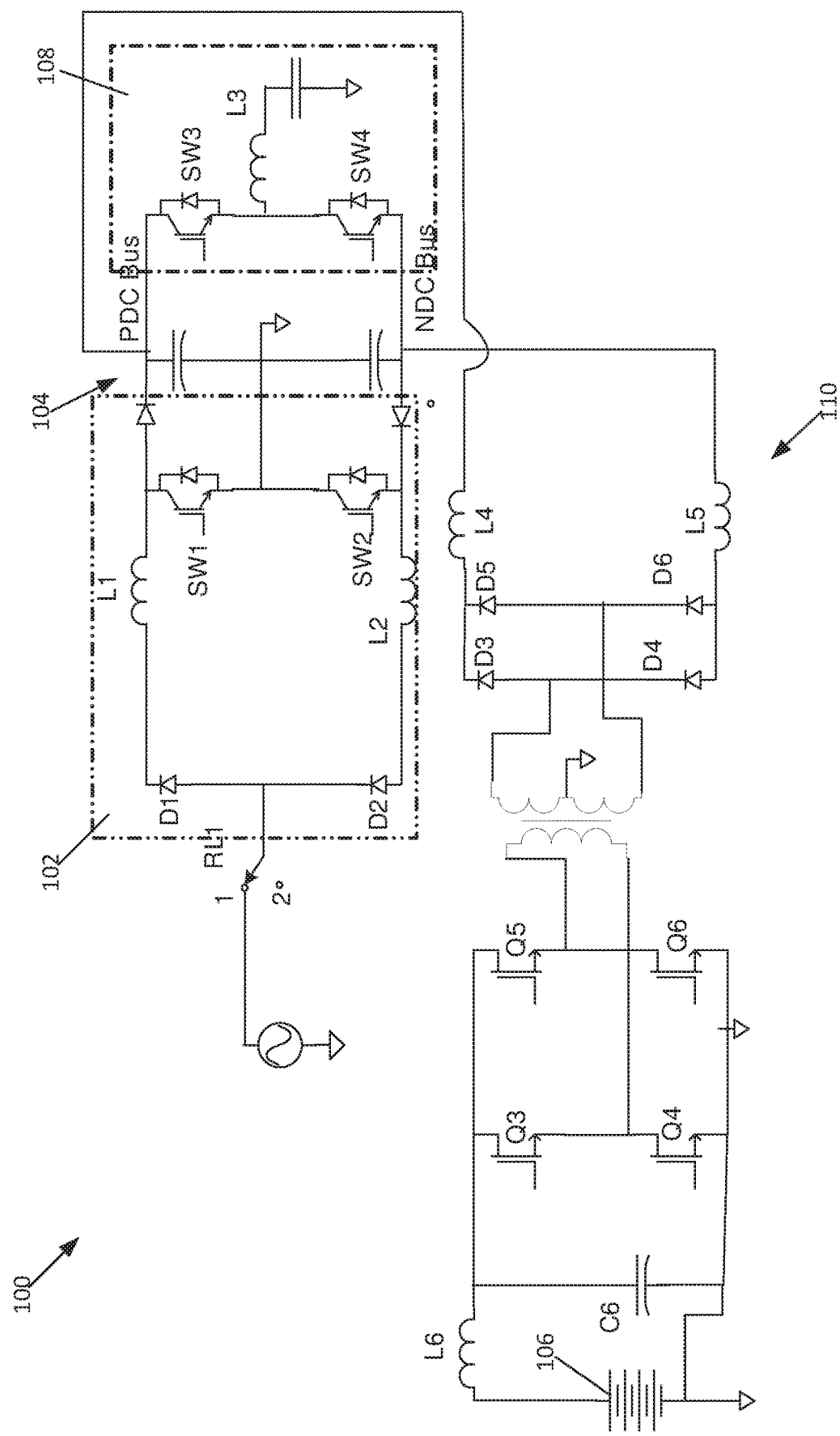
FIG. 1 is a schematic diagram of a conventional online UPS according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including,"

"comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. A traditional low power (e.g., 3 kVA or lower) online UPS topology 100 (e.g., shown in FIG. 1) typically comprises a front-end Power Factor Correction (PFC) circuit 102 that rectifies input AC power provided by an electric utility and feeds DC power to a split DC bus 104 in an online mode of operation. The split DC bus 104 is followed by an inverter circuit 108 that generates, in the online mode of operation, an AC output voltage from the DC power on the DC bus 104 and provides the AC output voltage to a load. In the absence of mains power, the UPS 100 is operated in a battery (i.e., backup) mode of operation where the front-end PFC circuit 102 is turned off and the split DC bus 104 is fed by a conventional DC-DC converter 110 drawing power from a battery 106. In the online mode of operation, the DC power on the split DC Bus 104 is also typically used to charge the battery 106 via the DC-DC converter 110.

The conventional DC-DC converter 110 includes a secondary rectifier and dedicated filters. The secondary rectifier of the DC-DC converter 110 includes two separate inductors and four diodes forming a full bridge rectifier which feeds power to the split DC bus 104. During the battery mode of operation, the PFC circuit-side components of the DC-DC converter 110 remain idle, resulting in relatively high component count, cost, and overall system size of the converter 110. In addition, such DC-DC converters are typically limited in that they do not provide for the ability to independently control the split DC bus voltage levels. For example, in the battery mode of operation where DC power is supplied from the battery 106 to the split DC bus 104, the same amount of power is injected into each individual DC bus in each switching cycle of the DC-DC converter 110. Hence individual DC bus voltage levels cannot be controlled based on its load demand and a DC bus voltage imbalance may result during unique load conditions (e.g., with a half-wave rectifier load).

Further, the conventional DC-DC converter 110 typically utilizes a Pulse Width Modulation (PWM) control scheme to maintain the DC bus voltage levels. However, at higher battery voltages, the input ripple currents of the converter 110 may also be higher, potentially resulting in the need for additional battery side current filters to reduce the ripple current drawn from the battery 106. In addition, the losses of a conventional DC-DC converter 110 can be relatively high due to hard switching. Accordingly, such converters are typically operated at lower frequency levels with relatively large magnetic and capacitive components.

A UPS topology is provided herein that can address many of the issues described above with respect to conventional DC-DC converters. For example, at least some embodiments described herein can reduce the component count, size, and cost of the corresponding UPS while also providing individual DC bus control.

Figure 2:
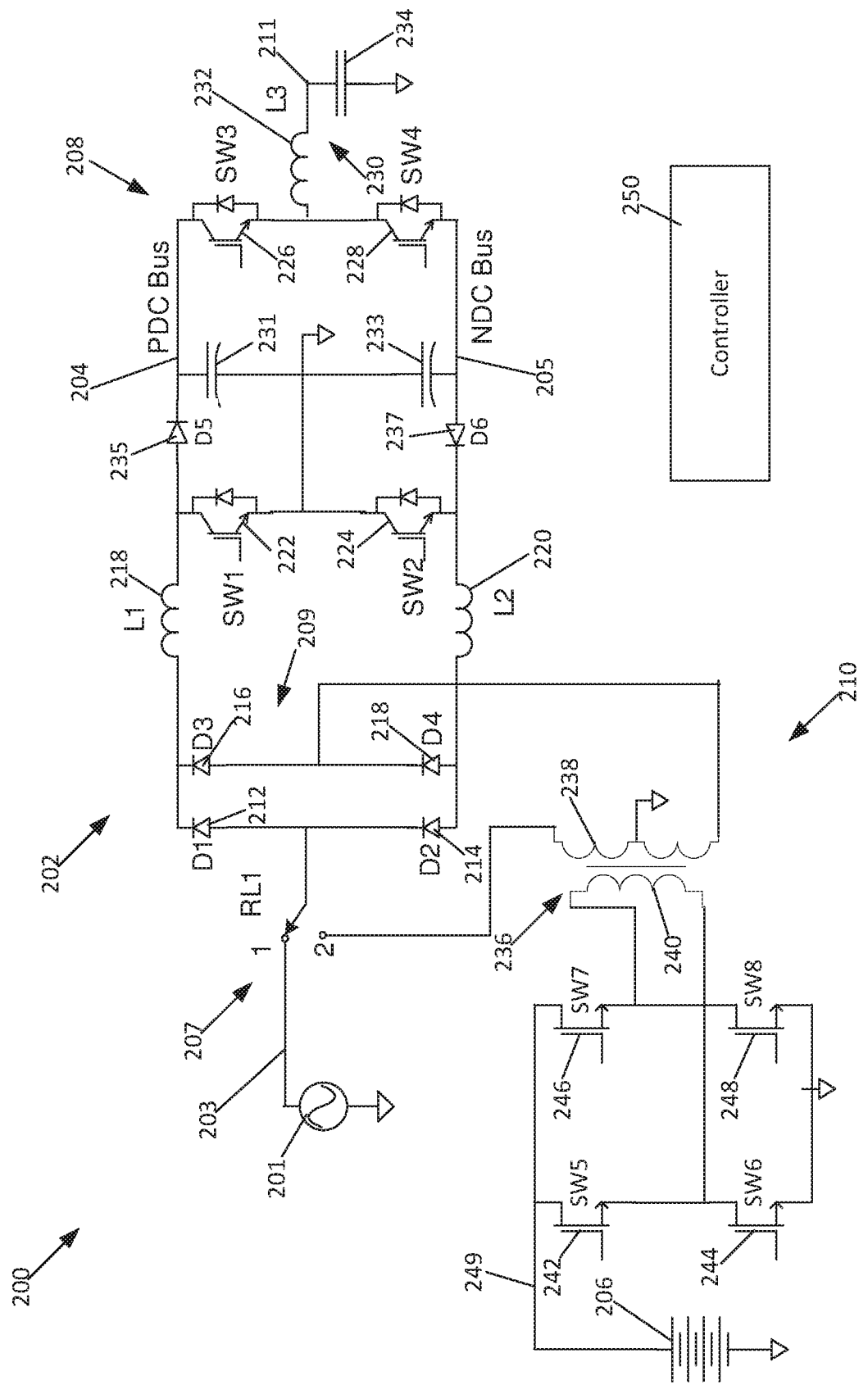
FIG. 2 is a schematic diagram of one embodiment of an online UPS according to aspects described herein.

FIG. 2 is a schematic diagram of an online UPS 200 according to aspects described herein. The UPS 200 includes a PFC converter 202, a line input 203, a positive DC bus 204, a negative DC bus 205, a relay 207, an inverter 208, a DC-DC converter 210, and an output 211. According to at least one embodiment, the PFC converter 202 includes a plurality of diodes 209 (e.g., D1 212, D2 214, D3 216, and D4 218), a first inductor (L1) 218, a second inductor (L2) 220, a first switch (SW1) 222, and a second switch (SW2) 224. According to at least one embodiment, the inverter 208 includes a third switch (SW3) 226, a fourth switch (SW4) 228, and an output filter 230 (including a third inductor (L3) 232 and an output capacitor 234.) In one embodiment, the first switch (SW1) 222, second switch (SW2) 224, third switch (SW3) 226, and fourth switch (SW4) 228 are Insulated Gate Bipolar Transistors (IGBT); however, in other embodiments, different types of switches or transistors can be utilized.

According to at least one embodiment, the DC-DC converter 210 includes a transformer 236 (including a first coil 238 and a second coil 240), a fifth switch (SW5) 242, a sixth switch (SW6) 244, a seventh switch (SW7) 246, an eighth switch (SW8) 248, and an interface 249. In one embodiment, the fifth switch (SW5) 242, sixth switch (SW6) 244, seventh switch (SW7) 246, and eighth switch (SW8) 248 are Metal Oxide-Semiconductor Field-Effect Transistors (MOSFET); however, in other embodiments, different types of switches or transistors can be utilized.

The input 203 is configured to be coupled to an AC power source 201. The relay 207 is configured to selectively couple one of the PFC converter 202 and the DC-DC converter 210 to the input 203. The plurality of diodes 209 is coupled to the relay 207. More specifically, the anode of the first diode (D1) 212 is coupled to the relay 207 and the cathode of the first diode (D1) 212 is coupled to a first terminal of the first inductor (L1) 218. The cathode of the second diode (D2) 214 is coupled to the relay and the anode of the second diode (D2) 214 is coupled to first terminal of the second inductor (L2) 220. The cathode of the third diode (D3) 216 is coupled to the first terminal of the first inductor (L1) 218 and the anode of the third diode (D3) 216 is coupled to the first coil 238 of the transformer 236. The anode of the fourth diode (D4) 218 is coupled to the first terminal of the second inductor (L2) 220 and the cathode of the fourth diode (D4) 218 is coupled to the first coil 238 of the transformer 236.

The second terminal of the first inductor (L1) 218 is coupled to the positive DC bus 204 via a fifth diode (D5) 235 and the second terminal of the second inductor (L2) 220 is coupled to the negative DC bus 205 via a sixth diode (D6) 237. The collector of the first switch (SW1) 222 is coupled to the second terminal of the first inductor (L1) and the emitter of the first switch (SW1) 222 is coupled to ground. The emitter of the second switch (SW2) 224 is coupled to the second terminal of the second inductor (L2) and the collector of the second switch (SW2) 224 is coupled to ground. The positive DC bus 204 is coupled to ground via a capacitor 231 and the negative DC bus 205 is coupled to ground via a capacitor 233. The collector of the third switch (SW3) 226 is coupled to the positive DC bus 204 and the emitter of the third switch (SW3) 226 is coupled to a first terminal of the third inductor (L3) 232. The emitter of the fourth switch (SW4) 228 is coupled to the negative DC bus 205 and the collector of the fourth switch (SW4) 228 is coupled to the first terminal of the third inductor (L3) 232. The second terminal of the third inductor (L3) 232 is coupled to the output 211 and the output capacitor 234 is coupled between the output 211 and ground.

A first end of the first coil 238 of the transformer 236 is coupled between the relay 207 and ground. A second end of the first coil 238 is coupled to the anode of the third diode (D3) 216 (and the cathode of the fourth diode (D4) 218). A first end of the second coil 240 of the transformer 236 is coupled to the source of the seventh switch (SW7) 246 and a second end of the second coil 240 is coupled to the drain of the sixth switch (SW6) 244. The source of the sixth switch (SW6) 244 and the source of the eight switch (SW8) 248 are each coupled to ground. The drain of the eighth switch (SW8) is coupled to the source of the seventh switch (SW7) 246. The source of the fifth switch (SW5) is coupled to the drain of the sixth switch (SW6) 244. The drain of the fifth switch (SW5) 242 and the drain of the seventh switch (SW7) 246 are each coupled to the interface 249. The interface 249 is configured to be coupled to a DC power source 206 (e.g., a battery). The UPS 200 further includes a controller coupled to the gate of each switch in the UPS 200 (i.e., switches SW1-SW7) and configured to transmit control signals to each gate.

The online UPS 200 minimizes the component count of the UPS compared to the existing topologies described above (e.g., shown in FIG. 1) by eliminating the need for separate inductors and one pair of diodes in the DC-DC converter 210. More specifically, the UPS 200 operates the DC-DC converter 210 close to a fixed duty ratio (e.g., 50%) and in conjunction with components of the PFC converter 202 to regulate the positive DC bus 204 and the negative DC bus 205 independently. By operating the DC-DC converter 210 close to a 50% duty ratio, the ripple current from the battery 206 can be reduced and the need for a battery side LC filter can be eliminated. Additionally, since the DC to DC converter 210 operates close to 50% duty ratio, Zero Voltage Switching (ZVS) can be achieved and the turn-on losses of the UPS 200 can be significantly reduced, resulting in a lower heatsink requirement. Also, due to ZVS operation, the DC-DC converter 200 can be operated at a relatively high frequency and the size of the transformer 236 can be reduced. Finally, as the controller 250 operates the DC-DC converter 210 in an open loop, the drivers of the UPS 200 can be simplified and the need for a separate controller for the DC-DC converter 210 can be eliminated. Operation of the UPS 200 is discussed in greater detail below.

Figure 3:
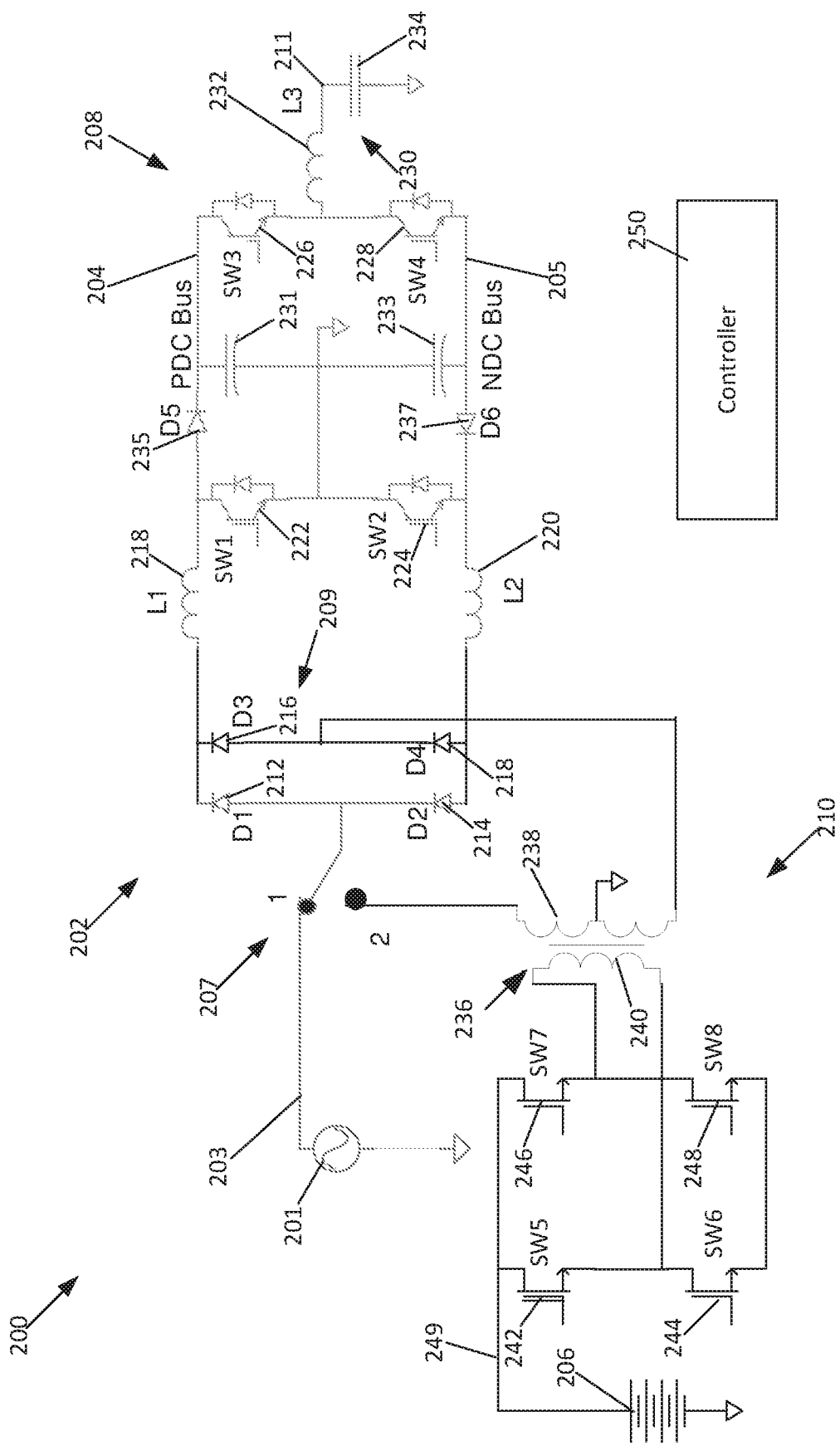
FIG. 3 is a schematic diagram of one embodiment of an online UPS in an online mode of operation according to aspects described herein.

The input 203 receives input AC power from the AC power source 201. The controller 250 monitors the input AC power received by the input 203 and is configured to operate the UPS 200 in different modes of operation based on the status of the input AC power. When AC power provided to the input 203 is acceptable (i.e., above an input power threshold), the controller 250 operates the UPS 200 in an online mode of operation. FIG. 3 is a schematic diagram of one embodiment of the UPS 200 in the online mode of operation.

As shown in FIG. 3, in the online mode of operation, the relay 207 is operated by the controller 250 to couple the input 203 to the PFC converter 202 and the input AC power from the input 203 is provided to the converter 202. As shown in FIG. 3, the converter 202 is a PFC converter; however, in other embodiments, other types of converters may be utilized. In the online mode of operation, the controller 250 operates the switches of the converter 204 (i.e., the first switch (SW1) 222 and the second switch (SW2) 224), in conjunction with the first diode (D1) 212 and the second diode (D2) 214, to convert the AC power from the input 203 into DC power and regulate the DC power provided to the positive DC bus 204 and the negative DC bus 205. In the online mode of operation, the third diode (D3) 216 and the fourth diode (D4) 218 are idle while the DC-DC converter 210 is in an off state. In the online mode of operation, the inverter 208 receives the DC power from the positive DC bus 204 and the negative DC bus 205, and the controller 250 operates the inverter 208 to convert the DC power into regulated AC power and provide regulated AC power to a load coupled to the output 211.

Figure 4:
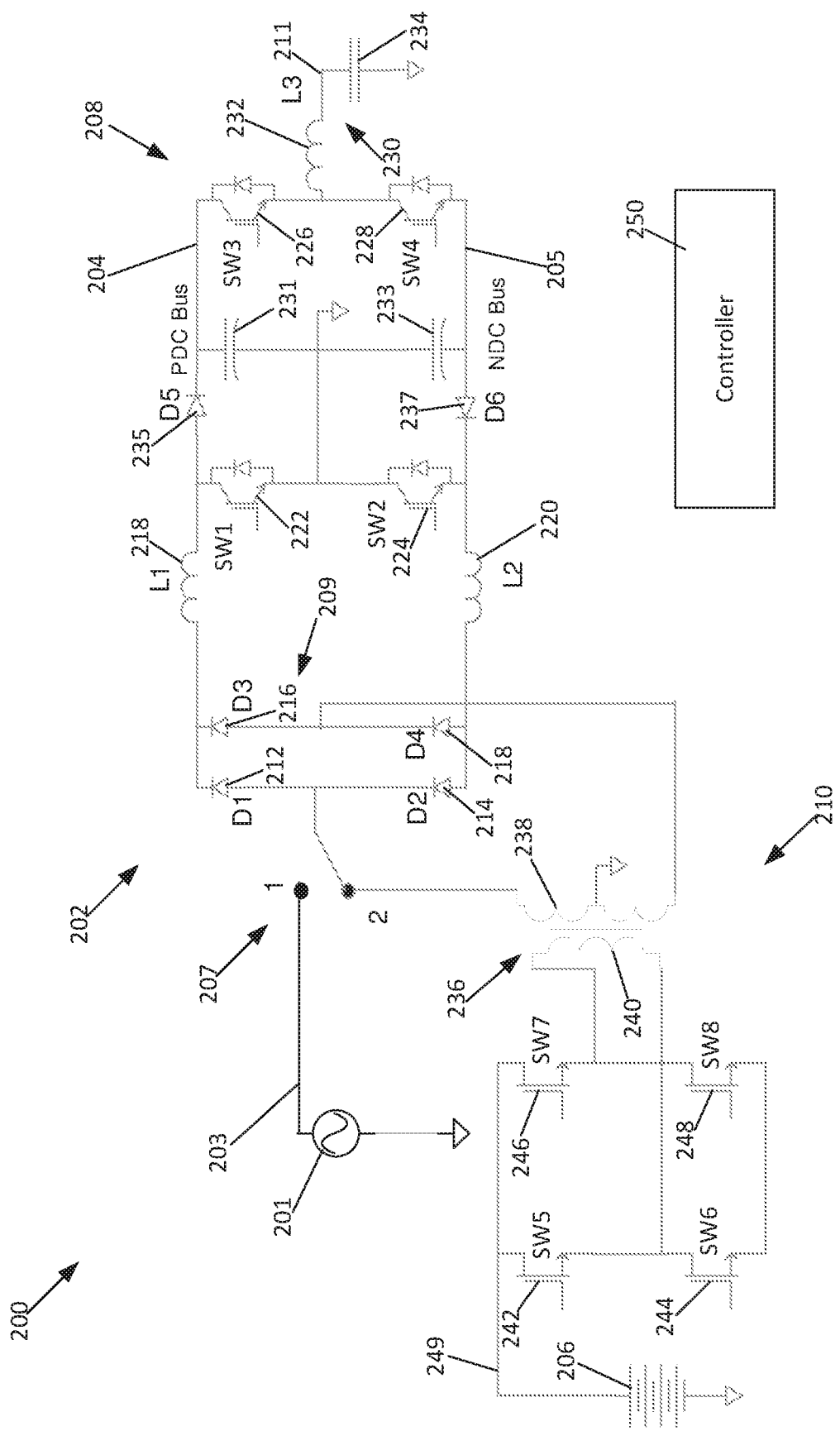
FIG. 4 is a schematic diagram of one embodiment of an online UPS in a backup mode of operation according to aspects described herein.
Figure 5:
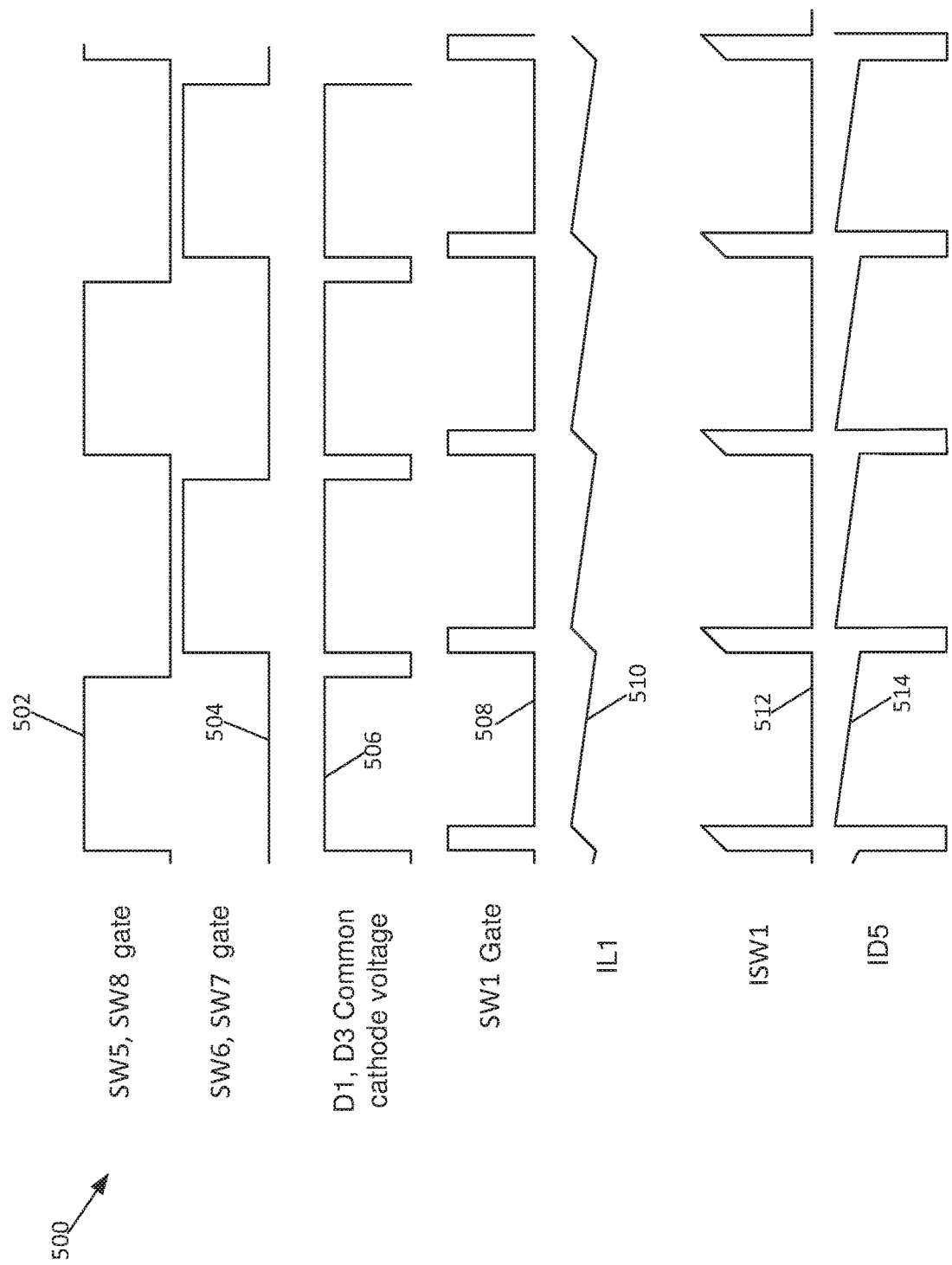
FIG. 5 is a graph illustrating operation of one embodiment of an online UPS according to aspects described herein.

When AC power provided to the input 203 is not acceptable (i.e., below an input power threshold), the controller 250 operates the UPS 200 in a battery mode of operation. FIG. 4 is a schematic diagram of one embodiment of the UPS 200 in the battery mode of operation and FIG. 5 is a graph 500 illustrating operation of the UPS 200 in the battery mode of operation. The graph 500 includes a first trace 502 representing a control signal transmitted from the controller 250 to the gates of the fifth switch (SW5) 242 and the eighth switch (SW8) 248, a second trace 504 representing a control signal transmitted from the controller 250 to the gates of the sixth switch (SW6) 244 and the seventh switch (SW7) 246, a third trace 506 representing the common cathode voltage of the first diode (D1) 212 and the third diode (D3) 216, a fourth trace 508 representing a control signal transmitted from the controller 250 to the gate of the first switch (SW1) 222, a fifth trace 510 representing the current through the first inductor (L1) 218, a sixth trace 512 representing current through the first switch (SW1) 222, and a seventh trace 514 representing current through the fifth diode (D5) 235.

In the battery mode of operation, the controller 250 operates the relay 207 to couple the DC-DC converter 210 to the PFC converter 202. DC power from the battery 206 is provided to the DC-DC converter 210 via the interface 249. The controller 250 operates the DC-DC converter 210, in conjunction with the plurality of diodes 209 of the PFC converter 202, as a full-bridge DC-DC converter where the DC output of the full-bridge DC-DC converter is unregulated. More specifically, the controller 250 operates the switches of the DC-DC converter 210 (i.e., the fifth switch (SW5) 242, the sixth switch (SW6) 244, the seventh switch (SW7) 246, and the eighth switch (SW8) 248) in an open loop at close to a fixed duty ratio (e.g., 50%) such that the switches 242, 244, 246, 248, in conjunction with the transformer 236, convert the DC power from the battery 206 into unregulated AC power. The transformer 236 also provides isolation between the battery 206 and the PFC converter 202 and according to one embodiment, the turns ratio of the transformer 236 is configured to minimize the boost factor.

The unregulated AC power is converted by the plurality of diodes 209 of the PFC converter 202 into unregulated DC power. The unregulated DC power is provided to a first boost converter portion of the converter 202 (formed by the first inductor (L1) 218, the first switch (SW1) 222, and the fifth diode (D5) 235) and a second boost converter portion of the converter 202 (formed by the second inductor (L2) 220, the second switch (SW2) 224, and the sixth diode (D6) 237. The first boost converter portion and the second boost converter portion are operated by the controller 250 to independently regulate the voltage on the positive DC bus 204 and the negative DC bus 205 respectively (i.e., DC power having a first voltage level is provided to the positive DC bus 204 and DC power having a second voltage level is provided to the negative DC bus 205). The voltage levels of the DC busses 204, 205 can be the same or different.

In the battery mode of operation, the inverter 208 receives the DC power from the positive DC bus 204 and the negative DC bus 205, and the controller 250 operates the inverter 208 to convert the DC power into regulated AC power and provide regulated AC power to a load coupled to the output 211.

The UPS 200 described above with respect to FIGS. 2-5 can address many of the issues described above with respect to conventional DC-DC converters (e.g., shown in FIG. 1). For example, by continuously operating the switches of the DC-DC converter at a fixed duty ratio (e.g., 50%) and utilizing components (e.g., the plurality of diodes 209 and the switches SW1 222 and SW2 224) of the PFC converter as also part of (i.e., in conjunction with) the DC-DC converter in the battery mode of operation, the total number of components in the UPS 200 can be reduced as compared to a conventional online UPS (e.g., two inductors and two diodes can be eliminated). Also, as the duty ratio of the DC-DC converter is fixed to a constant level (e.g., 50%) regardless of the battery voltage or load variations, separate control of the DC-DC converter 210 is not required. The continuous duty ratio operation of the DC-DC converter 210 also can reduce ripple current from the battery 206.

Additionally, as the duty ratio of the DC-DC converter 210 is maintained at a constant, open loop, level (e.g., 50%), it may be possible to adjust the dead-band to achieve Zero Voltage Switching (ZVS) without adding an extra ZVS circuit. With ZVS, the UPS 200 can be operated at a higher frequency and the size of the transformer 236 can be reduced. Also, lower switching losses may allow for smaller heatsink to be utilized when compared to a conventional UPS. Further, by operating the switches of the DC-DC converter 210 at a 50% duty ratio, the transformer utilization factor can be kept at a maximum.

Figure 6:
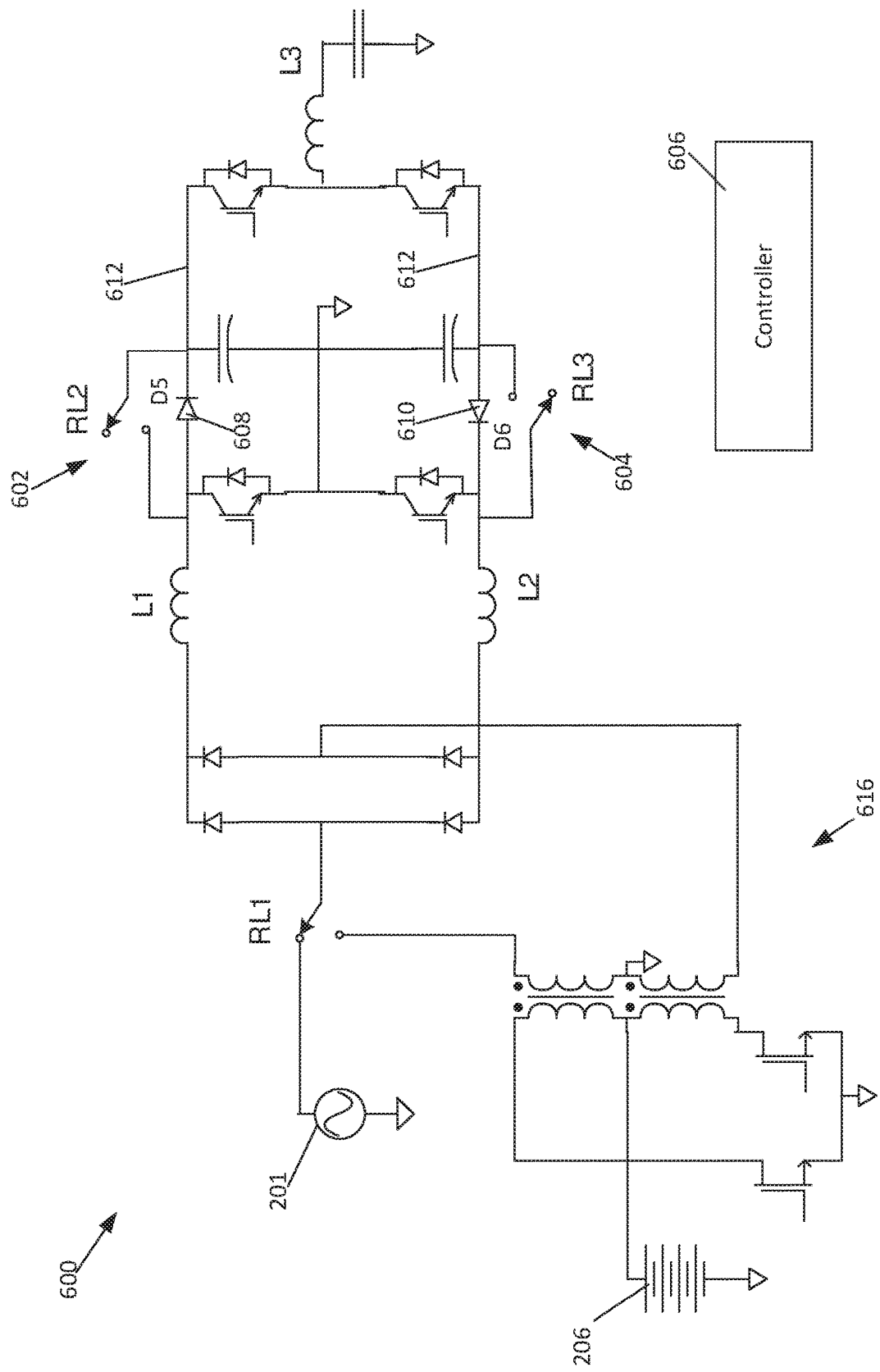
FIG. 6 is a schematic diagram of another embodiment of an online UPS according to aspects described herein.

The UPS described above with respect to FIGS. 2-5 can be implemented with different features. For example, FIG. 6 is a schematic diagram of one embodiment of an online UPS 600 according to aspects described herein. The UPS 600 is similar to the UPS 200 described with respect to FIGS. 2-5 except that the UPS 600 includes additional relays (RL2 602 and RL3 604). The additional relays can be operated by the controller 606 to bypass diodes D5 608 and D6 610 such that in the battery mode of operation, the resulting H-bridge converter supplies power to both the positive DC bus 612 and the negative DC bus 614. The UPS 600 is also different than the UPS 200 in that the UPS 600 includes a push-pull DC-DC converter 616 rather than a full-bridge DC-DC converter.

Figure 7:
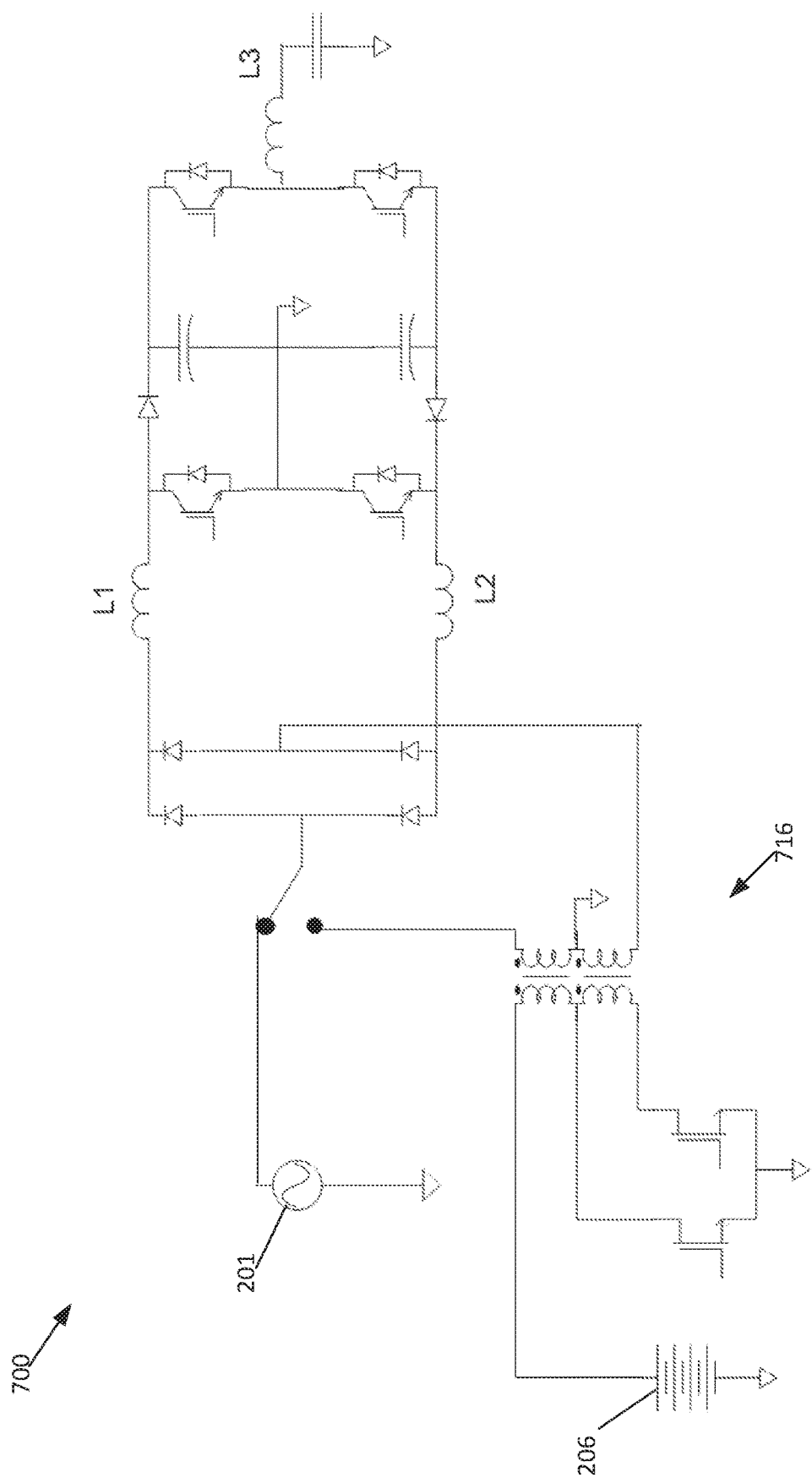
FIG. 7 is a schematic diagram of another embodiment of an online UPS according to aspects described herein.

FIG. 7 is another schematic diagram of one embodiment of an online UPS 700 according to aspects described herein. The UPS 700 is substantially the same as the UPS 200 shown in FIG. 2 except that the UPS 700 includes a push-pull DC-DC converter 716 rather than a full-bridge DC-DC converter.

Figure 8:
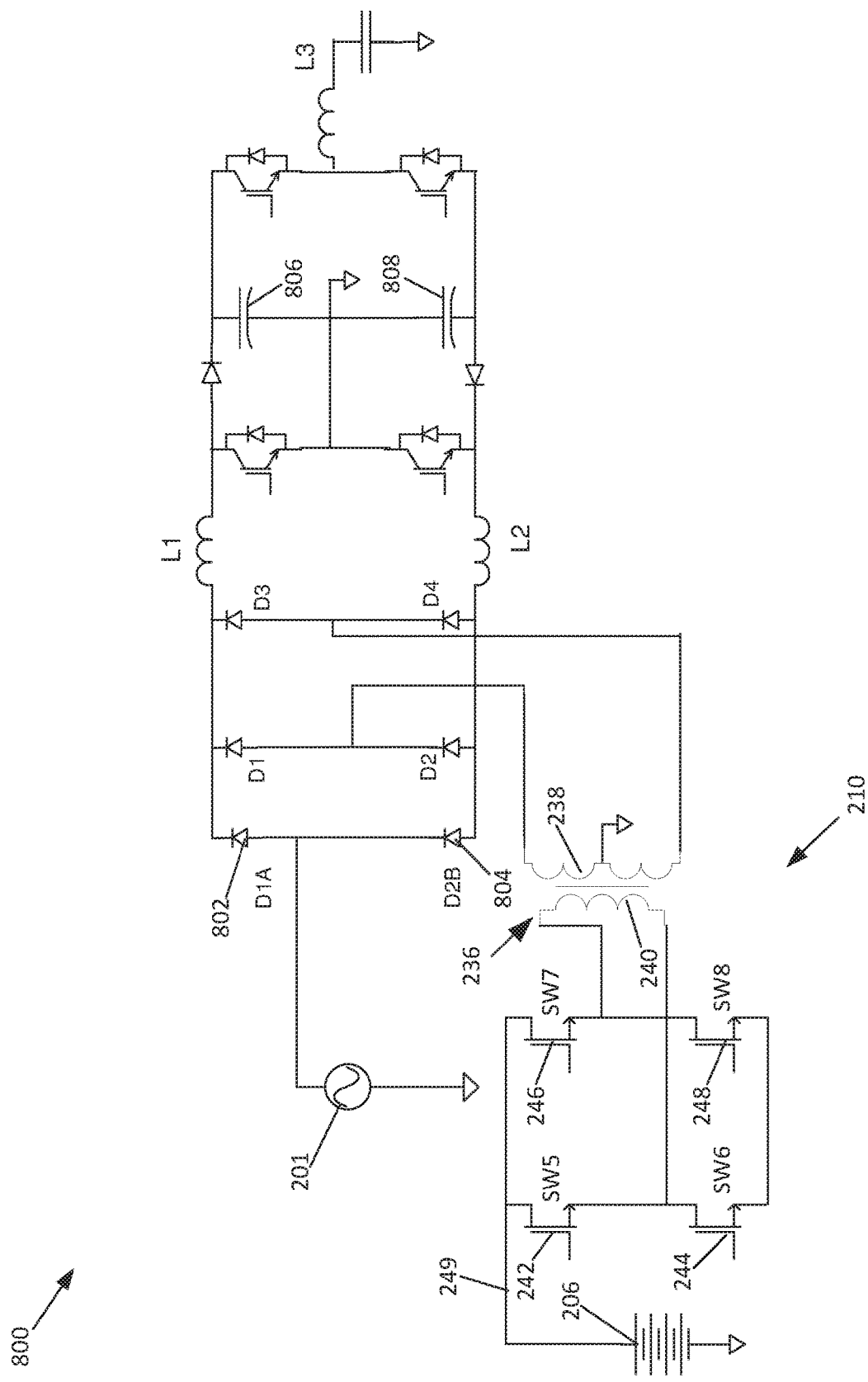
FIG. 8 is a schematic diagram of another embodiment of an online UPS according to aspects described herein.

According to another embodiment shown in FIG. 8, the relay (RL1) 207 shown in FIG. 2 is replaced with low frequency diodes D1A 802 and D2B 804 to minimize the transfer time between online mode of operation and battery mode of operation. In such an embodiment, the hold-up time required by the high voltage DC capacitors 806, 808 can be minimized.

As discussed above, the controller 250 is configured to monitor and control operation of the UPS 200. Using data stored in associated memory, the controller 250 is operable to execute one or more instructions that may result in the manipulation of one or more switches' conductive states. In some examples, the controller 250 can include one or more processors or other types of controllers. The controller 250 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As described above, the DC-DC converter can be operated at a fixed duty ratio of 50%; however, in other embodiments, the fixed duty ratio can be defined at any appropriate level.

As also described above, a low power online UPS configured to be coupled to AC mains and a backup battery is provided; however, in other embodiments, features of the system described above can be implemented in another type of UPS (e.g., a high power online UPS, a solar based UPS system, etc.) or power system.

Further, as described above, the online UPS provided output AC power; however, in at least one embodiment, the UPS is a DC UPS that provides output DC power.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) comprising:
   a line input configured to be coupled to an AC power source and to receive input AC power;
   an interface configured to be coupled to a DC power source and to receive backup DC power;
   an output configured to provide output power to a load;
   a PFC converter including a rectifier section configured to provide unregulated DC power and a switched converter section configured to provide regulated DC power;
   a positive DC bus coupled to the PFC converter and configured to provide a positive DC output;
   a negative DC bus coupled to the PFC converter and configured to provide a negative DC output;
   a DC-DC converter coupled to the interface including a first converter portion configured to provide unregulated AC power and a second converter portion configured to provide unregulated DC power, the second converter portion including the rectifier section of the PFC converter; and
   a controller configured to:
      operate, in an online mode of operation, the rectifier section of the PFC converter to convert the input AC power into the unregulated DC power and the switched converter section of the PFC converter to provide regulated DC power, derived from the unregulated DC power, to the positive DC bus and the negative DC bus; and
      operate, in a backup mode of operation, the first converter portion of the DC-DC converter to convert the backup DC power into the unregulated AC power, the rectifier section of the PFC converter to convert the unregulated AC power into the unregulated DC power, and the switched converter section of the PFC converter to provide regulated DC power, derived from the unregulated DC power, to the positive DC bus and the negative DC bus.

2. The UPS of claim 1, further comprising a relay configured to selectively couple the PFC converter to one of the line input and the DC-DC converter,
  wherein, in the online mode of operation, the controller is further configured to operate the relay to couple the PFC converter to the line input, and
  wherein, in the backup mode of operation, the controller is further configured to operate the relay to couple the PFC converter to the first converter portion of the DC-DC converter.

3. The UPS of claim 1, wherein in operating the switched converter section of the PFC converter to provide the regulated DC power, derived from the unregulated DC power, to the positive DC bus and the negative DC bus, the controller is further configured to operate the switched converter section of the PFC converter to independently provide first regulated DC power having a first voltage level, derived from the unregulated DC power, to the positive DC bus and second regulated DC power having a second voltage level, derived from the unregulated DC power, to the negative DC bus.

4. The UPS of claim 1, wherein the first converter portion of the DC-DC converter includes
  a first plurality of switches coupled to the interface, and
  a transformer coupled to the first plurality of switches.

5. The UPS of claim 4, wherein in operating the first converter portion of the DC-DC converter to convert the backup DC power into the unregulated AC power, the controller is further configured to operate the first plurality of switches at a fixed duty cycle in an open loop, in conjunction with the transformer, to generate the unregulated AC power.

6. The UPS of claim 5, wherein in operating the first plurality of switches, the controller is further configured to operate the first plurality of switches at a 50% duty cycle.

7. The UPS of claim 5, wherein the rectifier section of the PFC converter includes
  a plurality of diodes coupled to the relay and the switched converter section of the PFC converter includes
  a second plurality of switches coupled to the plurality of diodes, the positive DC bus, and the negative DC bus.

8. The UPS of claim 7, wherein in operating the PFC converter to provide regulated DC power, derived from the input AC power, to the positive DC bus and the negative DC bus, the controller is further configured to operate the second plurality of switches, in conjunction with the plurality of diodes, to generate the regulated DC power, derived from the input AC power.

9. The UPS of claim 8, wherein in operating the switched converter section of the PFC converter to provide regulated DC power, derived from the unregulated DC power, to the positive DC bus and the negative DC bus, the controller is further configured to operate the second plurality of switches, in conjunction with the plurality of diodes, to generate the regulated DC power, derived from the unregulated DC power.

10. The UPS of claim 1, further comprising an inverter coupled to the positive DC bus and the negative DC bus, wherein the controller is further configured to operate, in the online mode of operation and the backup mode of operation, the inverter to convert the regulated DC power from the positive DC bus and the negative DC bus into output AC power.

11. A method for operating a UPS comprising an input configured to be coupled to an AC power source, an interface configured to be coupled to a DC power source, a converter including a rectifier section configured to provide unregulated DC power and a switched converter section configured to provide regulated DC power, a positive DC bus coupled to the converter, a negative DC bus coupled to the converter, and a DC-DC converter coupled to the interface including a first converter portion configured to provide unregulated AC power and a second converter portion configured to provide unregulated DC power, the second converter portion including the rectifier section of the converter, wherein the method comprises:
  receiving input AC power at the input from the AC power source;
  receiving backup DC power at the interface from the DC power source;
  operating the UPS in an online mode of operation in response to a determination that the input AC power is greater than an input power threshold;
  operating the UPS in a backup mode of operation in response to a determination that the input AC power is less than the input power threshold;
  converting, with the rectifier section of the converter in the online mode of operation, the input AC power into the unregulated DC power;
  converting, with the switched converter section of the converter in the online mode of operation, the unregulated DC power into the regulated DC power and providing the regulated DC power to the positive DC bus and the negative DC bus;
  converting, with the first converter portion of the DC-DC converter in the backup mode of operation, the backup DC power into the unregulated AC power and providing the unregulated AC power to the rectifier section of the converter;
  converting, with the rectifier section of the converter in the backup mode of operation, the unregulated AC power into the unregulated DC power and providing the unregulated DC power to the switched converter section of the converter; and
  converting, with the switched converter section of the converter in the backup mode of operation, the unregulated DC power into the regulated DC power and providing the regulated DC power, derived from the unregulated DC power, to the positive DC bus and the negative DC bus.

12. The method of claim 11, wherein the UPS further comprises a relay configured to selectively couple the rectifier section of the converter to one of the input and the first converter portion of the DC-DC converter,
  wherein operating the UPS in the online mode of operation comprises operating the relay to couple the rectifier section of the converter to the input, and
  wherein, operating the UPS in the backup mode of operation comprises operating the relay to couple the rectifier section of the converter to the first converter portion of the DC-DC converter.

13. The method of claim 11, wherein providing the regulated DC power, derived from the unregulated DC power, to the positive DC bus and the negative DC bus comprises independently providing first regulated DC power having a first voltage level, derived from the unregulated DC power, to the positive DC bus and second regulated DC power having a second voltage level, derived from the unregulated DC power, to the negative DC bus.

14. The method of claim 11, wherein converting, with the first converter portion of the DC-DC converter in the backup mode of operation, the backup DC power into the unregulated AC power comprises operating a first plurality of switches in the first converter portion of the DC-DC converter at a fixed duty cycle in an open loop to generate the unregulated AC power.

15. The method of claim 14, wherein operating the first plurality of switches in the first converter portion of the DC-DC converter at the fixed duty cycle in the open loop to generate the unregulated AC power comprises operating the first plurality of switches at a 50% duty cycle.

16. The method of claim 14, wherein converting, in the online mode of operation, the input AC power into the regulated DC power with the converter comprises operating a second plurality of switches in the switched converter section of the converter to generate the regulated DC power, derived from the input AC power.

17. The method of claim 16, wherein converting, with the switched converter section of the converter in the backup mode of operation, the unregulated DC power into the regulated DC power comprises operating the second plurality of switches in the switched converter section of the converter to generate the regulated DC power, derived from the unregulated DC power.

18. The method of claim 11, further comprising converting, with an inverter in the online mode of operation and the backup mode of operation, the regulated power from the positive DC bus and the negative DC bus into output AC power and providing the output AC power to a load coupled to the output.

19. A UPS comprising:
an input configured to be coupled to an AC power source and to receive input AC power;
an interface configured to be coupled to a DC power source and to receive backup DC power;
an output configured to provide output power to a load;
a converter including a rectifier section configured to provide unregulated DC power and a switched converter section configured to provide regulated DC power;
a positive DC bus coupled to the converter;
a negative DC bus coupled to the converter;
an inverter coupled to the positive DC bus and the negative DC bus;
a DC-DC converter coupled to the interface including a first converter portion configured to provide unregulated AC power and a second converter portion configured to provide unregulated DC power; and
means for providing isolation between the interface and the converter, for generating the output power derived from at least one of the input AC power and the backup DC power, for independently regulating a voltage level of the positive DC bus and a voltage level of the negative DC bus when the output AC power is derived from the backup DC power, for utilizing the rectifier section of the converter to convert the input AC power into the unregulated DC power and the switched converter section of the converter to provide the regulated DC power to the positive DC bus and the negative DC bus when the output AC power is derived from the input AC power, and for utilizing the rectifier section of the converter as the second converter portion of the DC-DC converter to convert the unregulated AC power into the unregulated DC power and the switched converter section of the converter to provide the regulated DC power to the positive DC bus and the negative DC bus when the output AC power is derived from the backup DC power.

* * * * *